United States Patent [19]

Hari

[11] 4,263,205
[45] Apr. 21, 1981

[54] MONOAZO PIGMENTS DERIVED FROM SUBSTITUTED AMINOTHIOPHENES
[75] Inventor: Stefan Hari, Allschwil, Switzerland
[73] Assignee: Ciba-Geigy Corporation, Ardsley, N.Y.
[21] Appl. No.: 44,123
[22] Filed: May 31, 1979
[30] Foreign Application Priority Data
Jun. 9, 1978 [CH] Switzerland .................. 6319/78
[51] Int. Cl.³ .............. C09B 29/20; C09B 29/22; C09D 3/48; C09D 11/02
[52] U.S. Cl. ................................. 260/152; 106/23; 106/288 Q; 106/297; 106/299; 106/308 Q; 106/309; 260/154; 260/155; 260/157; 428/432
[58] Field of Search .................. 260/152, 146 R
[56] References Cited

U.S. PATENT DOCUMENTS

| 1,758,385 | 5/1930 | Zerweck | 260/158 |
| 2,144,219 | 1/1939 | Etzelmiller | 260/152 |
| 2,149,236 | 2/1939 | Zahn et al. | 260/152 |
| 2,443,598 | 6/1948 | Cheney et al. | 260/152 X |
| 2,468,457 | 4/1949 | Orem et al. | 260/152 |
| 2,625,542 | 1/1953 | Long | 260/152 |
| 2,625,552 | 1/1953 | Long | 260/152 X |
| 2,703,319 | 3/1955 | Fischer | 260/203 |
| 3,600,374 | 8/1971 | Mory | 260/152 |

Primary Examiner—Floyd D. Higel
Attorney, Agent, or Firm—Luther A. R. Hall; Joseph F. DiPrima

[57] ABSTRACT

Monoazo pigments of the formula I

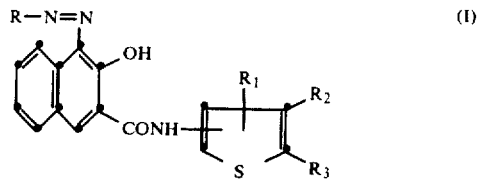

in which R is the radical of a carbocyclic or heterocyclic aromatic amine and $R_1$, $R_2$ and $R_3$ are hydrogen, halogen, alkyl, alkoxy, alkoxycarbonyl, substituted or unsubstituted aminocarbonyl, nitro, cyano or trifluoromethyl. These pigments are suitable for coloring high molecular weight organic material and are distinguished by their easy accessibility and good general fastness properties and in particular by high clarity of color shade.

6 Claims, No Drawings

MONOAZO PIGMENTS DERIVED FROM SUBSTITUTED AMINOTHIOPHENES

The present invention relates to novel valuable monoazo pigments of the formula I

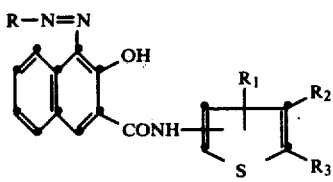

in which R is the radical of a carbocyclic or heterocyclic aromatic amine and $R_1$, $R_2$ and $R_3$ are hydrogen, halogen, alkyl, alkoxy, alkoxycarbonyl, substituted or unsubstituted aminocarbonyl, nitro, cyano or trifluoromethyl.

Monoazo pigments of the formula I which are of particular interest are those in which $R_1$, $R_2$ and $R_3$ are hydrogen, halogen, alkyl or alkoxy having 1–4 C atoms, nitro, cyano, trifluoromethyl or a group of the formulae $-COOCH_3$, $-COOC_2H_5$, $-CONH_2$ or

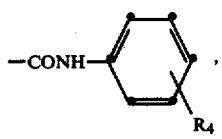

$R_4$ is hydrogen, halogen or alkyl or alkoxy having 1–4 C atoms and R is a group of the formula II

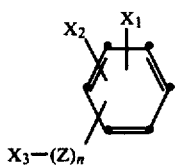

in which $X_1$ and $X_2$ are hydrogen, halogen or alkyl or alkoxy having 1–4 C atoms, Z is a group of the formulae (first-mentioned valency bonded to the phenyl nucleus) $-CONH-$, $-NHCO-$, $-COO-$, $-NHCONH-$, $-CO-$ or $-N=N-$, n is the numbers 1 or 0, but preferably 1, and, if $n=1$, $X_3$ is a phenyl group which is unsubstituted or substituted by halogen, alkyl or akoxy having 1–4 C atoms, cyano, trifluoromethyl or a group of the formulae $-COOX_4$, $-NHCOX_4$, $-CONHX_4$ or $-CONH_2$ and can contain one, two or three identical or different substituents and $X_4$ is alkyl having 1–4 C atoms or phenyl or benzyl which are unsubstituted or substituted by halogen or alkyl having 1–4 C atoms and, if $n=O$, $X_3$ is a heterocyclic radical of the formula III

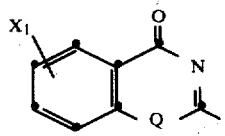

in which Q is an oxygen or sulfur atom or a $-NH-$ group and $X_1$ is as defined above, or $X_2$ and $X_3$ together with the benzene ring to which they are bonded form a binuclear heterocyclic system of the formula IV

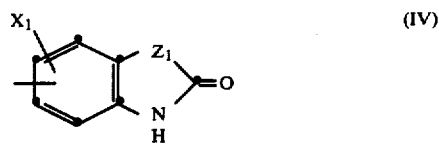

in which $X_1$ is as defined above and $Z_1$ is an oxygen or sulfur atom or a group of the formulae $-CO-$, $-NHCO-$, $-CONH-$,

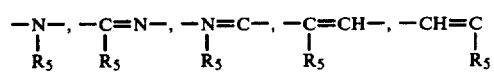

or $-O-CH_2-$, in which $R_5$ is hydrogen, alkyl having 1–4 C atoms or phenyl which is unsubstituted or substituted by halogen or alkoxy having 1–4 C atoms.

Any halogen substituents are in particular chlorine or bromine and preferably chlorine.

Any substituents which are alkyl groups having 1–4 C atoms are, for example, the methyl, ethyl, n-propyl, isopropyl, n-butyl, sec.-butyl or tert.-butyl group, but preferably the methyl or ethyl group.

Any substituents which are alkoxy groups having 1–4 C atoms are, for example, methoxy, ethoxy, n-propoxy, isopropoxy, n-butoxy or tert.-butoxy groups, but especially the methoxy and ethoxy group.

Monoazo pigments of the formula I which are of very particular interest are those in which R is a group of the formula IV

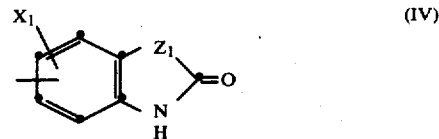

in which $X_1$ and $Z_1$ are as defined above.

Preferred monoazo pigments of the formula I are those in which R is a group of the formula V

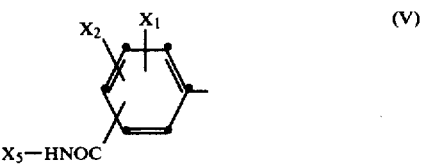

in which $X_1$ and $X_2$ are as defined above and $X_5$ is a phenyl group which is unsubstituted or substituted by chlorine, alkyl or alkoxy having 1–4 C atoms, trifluoromethyl or a group of the formulae $-COOX_4$, $-CONHX_4$, $-NHCOX_4$ or $-CONH_2$, in which $X_4$ is as defined above, and can contain one, two or three identical or different substituents.

Particularly preferred monoazo pigments of the formula I are those in which R is a group of the formula VI

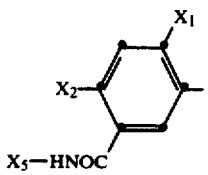

in which $X_1$, $X_2$ and $X_5$ are as defined above.

Very particularly preferred monoazo pigments of the formula I are those in which $R_2$ is a methyl group, $R_1$ is a cyano group or a —$COOR_6$ group and $R_3$ is a —$COOR_6$ group, in which $R_6$ is methyl or ethyl, and the carbonylamino group is bonded to thiophen in the 2-position and $R_1$ is bonded to thiophen in the 3-position.

The monoazo pigments of the formula I are obtained by (a) coupling the diazo compound of an amine of the formula VII

with a naphthoic acid amide of the formula VIII

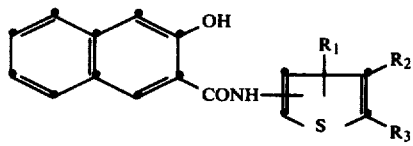

or (b) subjecting an azocarboxylic acid halide of the formula IX

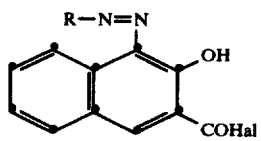

to a condensation reaction with an amine of the formula X

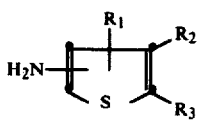

in which formulae VII, VIII, IX and X R, $R_1$, $R_2$ and $R_3$ are as defined above.

The amines of the formula VII, the diazo compounds of which are used as the diazo component for the preparation of the pigments according to the invention, are generally known and can be prepared by known methods.

Examples of such amines are: 1-amino-2-chlorobenzene-5-carboxylic acid phenylamide, 1-amino-2,5-dichlorobenzene-4-carboxylic acid amide, 1-amino-2,5-dichlorobenzene-4-carboxylic acid phenylamide, 1-amino-2,4-dichlorobenzene-5-carboxylic acid phenylamide, 1-amino-2,4-dichlorobenzene-5-carboxylic acid 4'-chloro-2'-methylphenylamide, 1-amino-2,4-dichlorobenzene-5-carboxylic acid 2'-chloro-5'-trifluoromethylphenylamide, 1-amino-2-methylbenzene-5-carboxylic acid phenylamide, 1-amino-2-methylbenzene-5-carboxylic acid benzylamide, 1-amino-2-methylbenzene-5-carboxylic acid 2'-chlorophenylamide, 1-amino-2-methylbenzene-5-carboxylic acid 4'-chlorophenylamide, 1-amino-2-methylbenzene-5-carboxylic acid 2',4'-dichlorophenylamide, 1-amino-2-methylbenzene-5-carboxylic acid 2'-methylphenylamide, 1-amino-2-methylbenzene-5-carboxylic acid 4'-methylphenylamide, 1-amino-2-methylbenzene-5-carboxylic acid 4'-methoxyphenylamide, 1-amino-2-methylbenzene-5-carboxylic acid 4'-chloro-2'-methylphenylamide, 1-amino-2-methylbenzene-5-carboxylic acid 4'-chloro-3'-methylphenylamide, 1-amino-2-methylbenzene-5-carboxylic acid 3'-trifluoromethylphenylamide, 1-amino-2-methylbenzene-4-carboxylic acid 4'-chloro-2'-methylphenylamide, 1-amino-2-methylbenzene-4-carboxylic acid phenylamide, 1-amino-2-methoxybenzene-4-carboxylic acid phenylamide, 1-amino-2-methoxybenzene-4-carboxylic acid 4'-methylphenylamide, 1-amino-2-methoxybenzene-5-carboxylic acid phenylamide, 1-amino-benzene-4-carboxylic acid 3'-trifluoromethylphenylamide, 1-amino-benzene-4-carboxylic acid 2'-chloro-phenylamide, 1-amino-benzene-4-carboxylic acid 2'-methyl-5'-chloro-phenylamide, 1-amino-2-methoxybenzene-5-carboxylic acid 2'-methyl-5'-chloro-phenylamide, 11-amino-2-methoxybenzene-5-carboxylic acid 2'-methyl-3'-chlorophenylamide, 1-amino-2-methoxybenzene-5-carboxylic acid 2'-chloro-5'-trifluoromethyl-phenylamide, 1-amino-2-methoxybenzene-5-carboxylic acid 2',5'-dichloro-phenylamide, 1-amino-2-chlorobenzene-5-carboxylic acid 2',4'-dichloro-phenylamide, 1-amino-2-chlorobenzene-5-carboxylic acid 2'-chloro-phenylamide, 1-amino-2-chlorobenzene-5-carboxylic acid 2'-chloro-5'-methoxycarbonyl-phenylamide, carbonyl-phenylamide, 1-amino-2-chlorobenzene-5-carboxylic acid 2'-methyl-phenylamide, 1-amino-2-chlorobenzene-5-carboxylic acid 3'-trifluoromethyl-phenylamide, 1-amino-2-chlorobenzene-5-carboxylic acid 2'-chloro-5'-trifluoromethyl-phenylamide, 1-amino-2-chlorobenzene-5-carboxylic acid 2'-methyl-3'-chloro-phenylamide, 1-amino-2-chlorobenzene-5-carboxylic acid 2'-methyl-5'-chlorophenylamide, 1-amino-2-methylbenzene-5-carboxylic acid 2',5'-dichloro-phenylamide, 1-amino-2-methylbenzene-5-carboxylic acid 3'-chloro-phenylamide, 1-amino-2-methylbenzene-5-carboxylic acid 2'-chloro-5'-trifluoromethyl-phenylamide, 1-amino-2-methylbenzene-5-carboxylic acid 2'-methoxy-phenylamide, 1-amino-2-methylbenzene-5-carboxylic acid 2'-trifluoromethyl-4'-chlorophenylamide, 1-amino-2-methylbenzene-3-carboxylic acid 2'-methylphenylamide, 1-amino-2-methylbenzene-3-carboxylic acid 3',4'-dichloro-phenylamide, 1-amino-2-methylbenzene-3-carboxylic acid-2',4',5'-trichlorophenylamide, 1-amino-2-methylbenzene-3-carboxylic acid 3'-trifluoromethylphenylamide, 1-amino-2-methylbenzene-3-carboxylic acid 4'-phenyl-phenylamide, 1-amino-2-ethoxybenzene-5-carboxylic acid 3'-chlorophenylamide, 1-amino-2-ethoxybenzene-5-carboxylic acid 4'-methyl-phenylamide, 1-amino-2-ethoxybenzene-5-carboxylic acid 2'-methyl-5'-chlorophenylamide, 4'-methylphenyl 1-amino-2-chlorobenzene-5-carboxylate, 4'-methylphenyl 1-amino-2-methoxybenzene-5-carboxylate, phenyl 1-amino-2-methylbenzene-5-carboxylate, 2'-chlorophenyl 1-amino-2-methylbenzene-5-carboxylate, 4'-chlorophenyl 1-amino-2-methylbenzene-5-carboxylate, 2',4'-dichlorophenyl 1-amino-2-methylbenzene-5-carboxylate, 2',4',5'-trichloro-phenyl 1-amino-2-methylbenzene-5-carboxylate, 2'-methyl-phenyl 1-amino-2-chlorobenzene-5-carboxylate, 4'-methyl-phenyl 1-amino-2-methylbenzene-5-carboxylate, 4'-phenylphenyl 1-amino-2-chlorobenzene-5-carboxylate, 4'-methoxy-phenyl 1-amino-2-methylbenzene-5-carboxylate, 4'-chloro-2'-methyl-phenyl 1-amino-2-methylbenzene-5-carboxylate, 4'-chloro-3'-methylphenyl 1-amino-2-methylbenzene-5-carboxylate, 4'-isobutyl-phenyl 1-amino-2-methylbenzene-5-carboxylate, 4'-methoxycarbonylphenyl 4-methyl-3-aminobenzoate, 4'-methoxycarbonylphenyl 4-chloro-3-aminobenzoate, 4'-methoxycarbonylphenyl 4-methoxy-3-amino-benzoate, 4'-methoxycarbonylphenyl 4-phenoxy-3-aminobenzoate, 3'-methoxycarbonylphenyl 4-methyl-3-aminobenzoate, 3'-methoxycarbonylphenyl 4-chloro-3-aminobenzoate, 4'-ethoxycarbonylphenyl 4-methyl-3-aminobenzoate, 3'-ethoxycarbonylphenyl 4-methoxy-3-aminobenzoate, 3'-ethoxycarbonylphenyl 4-methyl-3-aminobenzoate, 4'-n-propoxycarbonylphenyl 4-methyl-3-aminobenzoate, 3'-n-propoxycarbonylphenyl 4-methyl-3-aminobenzoate, 3'-n-propoxycarbonylphenyl 4-methyl-3-aminobenzoate, 4'-isopropoxycarbonylphenyl 4-methyl-3-aminobenzoate, 3'-isopropoxycarbonylphenyl 4-methyl-3-aminobenzoate, 4'-isopropoxycarbonylphenyl 4-chloro-3-aminobenzoate, 4'-isopropoxycarbonylphenyl 4-methoxy-3-aminobenzoate, 4'-benzyloxycarbonylphenyl 4-methyl-3-aminobenzoate, 4'-β-chloroethoxycarbonylphenyl 4-methyl-3-aminobenzoate, 3'-β-chloroethoxycarbonylphenyl 4-methyl-3-aminobenzoate, 4'-n-butoxycarbonylphenyl 4-methyl-3-aminobenzoate, 4'-isobutoxycarbonylphenyl 4-methyl-3-aminobenzoate, 1-amino-2-methoxy-5-benzoylaminobenzene, 1-amino-2-methoxy-5-(2'-chlorobenzoylamino)-benzene, 1-amino-2-methoxy-5-(4'-chlorobenzoylamino)-benzene, 1-amino-2-methoxy-5-(2',4'-dichlorobenzoylamino)-benzene, 1-amino-2-methoxy-5-(2'-thienoylamino)-benzene, 1-amino-2-methoxy-5-(2'-furoylamino)-benzene, 1-amino-2-methoxy-4-benzoylaminobenzene, 1-amino-2-methoxy-5-(4'-methoxybenzoylamino)benzene, 1-amino-2-methoxy-3-benzoylaminobenzene, 1-amino-2-methoxy-6-benzoylaminobenzene, 1-amino-2,5-dimethoxy-4-benzoylaminobenzene, 1-amino-2,5-dimethoxy-4-(2'-chlorobenzoylamino)-benzene, 1-amino-2,5-dimethoxy-4-(4'-chlorobenzoylamino)-benzene, 1-amino-2,5-dimethoxy-4-(2'-methylbenzoylamino)-benzene, 1-amino-2,5-dimethoxy-4-(4'-methylbenzoylamino)-benzene, 1-amino-2,5-dimethoxy-3-benzoylaminobenzene, 1-amino-2-methoxy-5-methyl-4-benzoylaminobenzene, 1-amino-2-methoxy-5-methyl-4-(2',4'-dichlorobenzoylamino)-benzene, 1-amino-2-methoxy-5-chloro-4-(2'-methylbenzoylamino)-benzene, 1-amino-2-methoxy-5-chloro-4-(4'-methylbenzoylamino)-benzene, 1-amino-2-methoxy-5-chloro-4-(2'-methoxybenzoylamino)-benzene, 1-amino-2-methoxy-5-chloro-4-(2'-thienylamino)-benzene, 1-amino-2-methoxy-5-chloro-4-(2'-furoylamino)-benzene, 1-amino-2-methoxy-5-nitro-4-benzoylaminobenzene, 1-amino-2-methoxy-5-nitro-4-(2'-chlorobenzoylamino)-benzene, 1-amino-2-methoxy-4-phenacetylaminobenzene, 1-amino-2-methoxy-5-phenacetylaminobenzene, 1-amino-2-methoxy-3-phenacetylaminobenzene, 1-amino-2,5-dimethoxy-4-phenacetylaminobenzene, 1-amino-2-methoxy-5-methyl-4-phenacetylaminobenzene, 1-amino-2-methoxy-5-chloro-4-phenacetylaminobenzene, 1-amino-2-methoxy-5-naphthylacetylaminobenzene, 1-amino-2-methoxy-5-phenoxyacetylaminobenzene, 1-amino-2-methoxy-5-(4'-chlorophenoxyacetylamino)-benzene, 1-amino-2-methoxy-5-phenylthioacetylaminobenzene, 1-amino-2-methoxy-4-phenylthioacetylaminobenzene, 1-amino-2,5-dimethoxy-4-phenylthioacetylaminobenzene, 1-amino-2-methoxy-5-methyl-4-phenylthioacetylaminobenzene, 1-amino-2-methoxy-5-chloro-4-phenylthioacetylaminobenzene, 1-amino-2-methoxy-5-chloro-4-phenylthioacetylaminobenzene, 1-amino-2-ethoxy-5-benzoylamino-benzene, 1-amino-2-ethoxy-5-(2'-chlorobenzoylamino)-benzene, 1-amino-2-ethoxy-5-(4'-chlorobenzoylamino)-benzene, 1-amino-2-ethoxy-5-(2',4'-dichlorobenzoylamino)-benzene, 1-amino-2-ethoxy-4-(2'-chlorobenzoylamino)-benzene, 1-amino-2-ethoxy-4-(4'-chlorobenzoylamino)-benzene, 1-amino-2-ethoxy-4-(2',4'-dichlorobenzoylamino)-benzene, 1-amino-2-ethoxy-5-(2'-methylbenzoylamino)-benzene, 1-amino-2-ethoxy-5-(4'-methylbenzoylamino)-benzene, 1-amino-2-ethoxy-4-(4'-methylbenzoylamino)-benzene, 1-amino-2-ethoxy-4-(2'-methylbenzoylamino)-benzene, 1-amino-2-ethoxy-5-(4'-methoxybenzoylamino)-benzene, 1-amino-2-ethoxy-4-(2'-methoxybenzoylamino)-benzene, 1-amino-2,5-diethoxy-4-benzoylaminobenzene, 1-amino-2,5-diethoxy-4-(2'-chlorobenzoylamino)-benzene, 1-amino-2,5-diethoxy-4-(4'-chlorobenzoylamino)-benzene, 1-amino-2,5-diethoxy-4-(2'-methylbenzoylamino)-benzene, 1-amino-2,5-diethoxy-4-(4'-methylbenzoylamino)-benzene, 1-amino-2,5-diethoxy-4-(2'-methoxybenzoylamino)-benzene, 1-amino-2-ethoxy-5-methyl-4-benzoylaminobenzene, 1-amino-2-ethoxy-5-chloro-4-benzoylaminobenzene, 1-amino-2-ethoxy-4-phenacetylaminobenzene, 1-amino-2-ethoxy-5-phenacetylaminobenzene, 1-amino-2,5-diethoxy-4-phenacetylaminobenzene, 1-amino-2,5-diethoxy-4-phenoxyacetylaminobenzene, 1-amino-2,5-diethoxy-4-phenylacetylaminobenzene, 1-amino-2-methyl-5-benzoylaminobenzene, 1-amino-2-methyl-4-benzoylaminobenzene, 1-amino-2,5-dimethyl-4-benzoylaminobenzene, 1-amino-2-methyl-5-chloro-4-benzoylaminobenzene, 1-amino-2-methyl-5-phenacetylaminobenzene, 1-amino-2-methyl-4-phenacetylaminobenzene, 1-amino-2-methyl-5-phenoxyacetylaminobenzene, 1-amino-2-methyl-4-phenoxyacetylaminobenzene, 1-amino-2,5-dimethyl-4-phenacetylaminobenzene, 1-amino-2,5-dimethyl-4-phenoxyacetylaminobenzene, 1-amino-2,5-dimethyl-4-phenylthioacetylaminobenzene, 1-amino-2-chloro-5-benzoylaminobenzene, 1-amino-2-chloro-4-benzoylaminobenzene, 1-amino-2,5-dichloro-4-benzoylaminobenzene, 1-amino-2-chloro-5-methyl-4-benzoylaminobenzene, 1-amino-2-chloro-5-phenacetylaminobenzene, 1-amino-2-chloro-4-phenacetylaminobenzene, 1-amino-2-chloro-5-phenoxyacetylaminobenzene, 1-amino-2-chloro-4-phenoxyacetylaminobenzene, 1-amino-2,5-dichloro-4-phenacetylaminobenzene, 1-amino-2,5-dichloro-4-phenoxyacetylaminobenzene, 1-amino-2,5-dichloro-4-phenylthioacetylaminobenzene, 1-amino-2-nitro-5-benzoylaminobenzene, 1-amino-2-nitro-4-benzoylaminobenzene, 1-amino-2-nitro-5-methyl-4-benzoylaminobenzene, 1-amino-2-nitro-5-chloro-4-benzoylaminobenzene, 1-amino-2-nitro-4-phenacetylaminobenzene, 1-amino-2-nitro-4-phenoxyacetylaminobenzene, 1-amino-2-nitro-4-(4'-chlorophenoxyacetylamino)-benzene, 1-amino-2-nitro-4-phenylthioacetylaminobenzene, 5-amino-benzimidazolone, 5-amino-1-methylbenzimidazolone, 5-amino-1-n-butyl-benzimidazolone, 5-amino-1-phenyl-benzimidazolone, 5-amino-1-p-chlorophenylbenzimidazolone, 5-amino-1-p-methylphenylbenzimidazolone, 5-amino-1-p-methoxyphenyl-benzimidazolone, 5-amino-1-p-acetylaminophenyl-benzimidazolone, 5-amino-6-chloro-benzimidazolone, 5-amino-1-acetyl-benzimidazolone, 5-amino-1-n-propyl-benzimidazolone, 5-amino-1-isopropyl-benzimidazolone, 5-amino-1-cyclohexyl-benzimidazolone, 5-amino-6-bromo-benzimidazolone, 5-amino-6-methyl-benzimidazolone, 5-amino-6-methoxy-benzimidazolone, 5-amino-6-ethoxybenzimidazolone, 6-amino-benzoxazolone, 5-amino-benzoxazolone, 6-amino-5-chloro-benzoxazolone, 6-amino-5-methylbenzoxazolone, 6-amino-4-quinazolone, 6-amino-2-methyl-4-quinazolone, 6-amino-2-methoxy-4-quinazolone, 6-amino-7-chloro-2-methyl-4-quinazolone, 6-amino-2-phenyl-4-quinazolone, 6-amino-2(4'-methoxyphenyl)-4-quinazolone, 6-amino-2(4'-methylphenyl)-4-quinazolone, 7-amino-4-quinazolone, 2-(4'-aminophenyl)-4-quinazolone, 2-(3'-aminophenyl)-4-quinazolone, 6-amino-3-phenmorpholone, 6-amino-8-chloro-3-phenmorpholone, 7-amino-6-chloro-3-phenmorpholone, 7-amino-6-nitro-3-phenmorpholone, 7-amino-6-methyl-3-phenmorpholone, 7-amino-6-methoxy-3-phenmorpholone, 6-amino-4-methyl-2-quinolone, 7-amino-4,6-dimethyl-2-quinolone, 6-amino-7-chloro-4-methyl-2-quinolone, 7-amino-4-methyl-6-methoxy-2-quinolone, 7-amino-6-chloro-4-methyl-2-quinolone, 7-amino-4-methyl-2-quinolone, 7-amino-4,8-dimethyl-2-quinolone, 7-amino-6-phenoxy-4-methyl-2-quinolone and 6-amino-5,8-diethoxy-4-methyl-2-quinolone.

The coupling components have the general formula XI

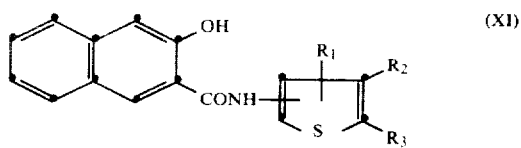

in which $R_1$, $R_2$ and $R_3$ are as defined. They can be prepared by known processes, for example by reacting 2-hydroxy-3-naphtholic acid chloride with the corresponding aminothiophen derivative. Examples of amino-thiophens are: 2-amino-thiophen, 3-amino-thiophen, 2-methyl-3-amino-thiophen, 2-methyl-4-amino-thiophen, 2-methyl-5-amino-thiophen, 3-methyl-2-amino-thiophen, 3-methyl-4-amino-thiophen, 3-methyl-5-amino-thiophen, 2-phenyl-5-amino-thiophen, 3-phenyl-2-amino-thiophen, 3-phenyl-5-amino-thiophen, 2,3-dimethyl-4-amino-thiophen, 2,3-dimethyl-5-amino-thiophen, 2,4-dimethyl-3-amino-thiophen, 2,4-dimethyl-5-amino-thiophen, 2,5-dimethyl3-amino-thiophen, 2,5-dimethyl-4-chloro-3-amino-thiophen, 2,3,4-trimethyl-5-amino-thiophen, 2,3,5-trimethyl-4-amino-thiophen, 2-chloro-3-amino-thiophen, 2-chloro-4-amino-thiophen, 2-chloro-5-amino-thiophen, 3-chloro-2-amino-thiophen, 3-chloro-4-amino-thiophen, 3-chloro-5-amino-thiophen, 2,3-dichloro-5-amino-thiophen, 2,3-dichloro-4-amino-thiophen, 2,4-dichloro-3-amino-thiophen, 2,4-dichloro-5-amino-thiophen, 2,5-dichloro-3-amino-thiophen, 2,5-dichloro-4-methyl-3-amino-thiophen, 2,3,4-trichloro-5-amino-thiophen, 2,3,5-trichloro-4-amino-thiophen, 2-bromo-5-amino-thiophen, 3-bromo-2-amino-thiophen, 2,3-dibromo-5-amino-thiophen, 2,3,4-tribromo-5-amino-thiophen, 2-methoxy-3-amino-thiophen, 2-methoxy-4-amino-thiophen, 2-methoxy-5-amino-thiophen, 3-methoxy-2-amino-thiophen, 2-nitro-5-amino-thiophen, 2-nitro-4-amino-thiophen, 2-trifluoromethyl-4-amino-thiophen, methyl 2-amino-5-thiophencarboxylate and ethyl 2-amino-5-thiophencarboxylate and especially 2-amino-3,5-dicarboethoxy-4-methyl-thiophen, 2-amino-3,5-dicarbomethoxy-4-methyl-thiophen, 2-amino-3,5-dicarboethoxy-4-phenyl-thiophen, 2-amino-3-carboethoxy-4-methyl-5-benzoylamino-thiophen, 2-amino-3-carbomethoxy-4-methyl-5-benzoylamino-thiophen, 2-amino-3-carboethoxy-4-methyl-5-(2'-chlorobenzoylamino)-thiophen, methyl 2-amino-3-cyano-4-methyl-5-thiophencarboxylate and ethyl 2-amino-3-cyano-4-methyl-5-thiophencarboxylate.

The diazotisation is carried out by known methods.

Coupling preferably takes place in a weakly acid medium, appropriately in the presence of conventional agents which promote the coupling reaction. Such agents are, in particular, dispersing agents, for example aralkylsulfonates, such as dodecyl benzenesulfonate, or 1,1'-dinaphthylmethane-2,2'-disulfonic acid or polycondensation products of alkylene oxides. The dispersion of the coupling component can also advantageously contain protective colloids, for example methylcellulose, or relatively small amounts of inert organic solvents which are sparingly soluble or insoluble in water, for example aromatic hydrocarbons, which can be halogenated or nitrated, such as benzene, toluene, xylene, chlorobenzene, dichlorobenzene or nitrobenzene, as well as aliphatic halogenohydrocarbons, for example carbon tetrachloride or trichloroethylene, and also water-miscible organic solvents, such as acetone, methyl ethyl ketone, methanol, ethanol or isopropanol or preferably dimethylformamide.

The coupling reaction can also advantageously be carried out by continuously combining an acid solution of the diazonium salt with an alkaline solution of the coupling component in a mixing nozzle, in which case immediate coupling of the components takes place. Care must be taken that the diazo component and the coupling component are present in equimolecular amounts in the mixing nozzle and it proves advantageous to use a slight excess of the diazo component. This is most simply achieved by monitoring the pH value of the liquid in the mixing nozzle. Provision must also be made for powerful agitation of the two solutions in the mixing nozzle. The resulting colorant dispersion is withdrawn continuously from the mixing nozzle and the colorant is separated off by filtration.

Finally, the coupling reaction can also be carried out by suspending the amine with the coupling component in a molar ratio of 1:1 in an organic solvent and treating the suspension with a diazotising agent, especially an ester of nitrous acid, such as methyl nitrite, ethyl nitrite, butyl nitrite, amyl nitrite or octyl nitrite, or with aqueous sodium nitrite solution.

The azocarboxylic acid, on which the halide of the formula IX is based, is obtained by coupling the diazo compound of an amine of the formula VII with 2-hydroxy-3-naphthoic acid.

The azo colorant carboxylic acids thus obtained are treated with agents which are able to convert carboxylic acids to their halides, for example the chlorides or bromides, and thus are treated in particular with phosphorus halides, such as phosphorus pentachloride, phosphorus trichloride or phosphorus pentabromide, or phosphorus oxyhalides and preferably with thionyl chloride.

The treatment with acid-halogenating agents of this type is advantageously carried out in inert organic solvents, such as dimethylformamide, chlorobenzenes, for example monochlorobenzene or dichlorobenzene, toluene, xylene or nitrobenzene, and in the case of the last 5 solvents mentioned, if desired with the addition of dimethylformamide.

When preparing the carboxylic acid halides it is as a rule advantageous first to dry the azo compounds, which are prepared in an aqueous medium, or to free them azeotropically from water by boiling in an organic solvent. If desired, azeotropic drying can be carried out immediately prior to the treatment with the acid-halogenating agents.

The condensation reaction between the carboxylic acid halides of the initially mentioned type and the amines is advantageously carried out in an anhydrous medium. Under this condition, the reaction generally takes place surprisingly easily, even below 100° C., or at temperatures which are in the boiling range of normal organic solvents such as toluene, monochlorobenzene, dichlorobenzene, trichlorobenzene, nitrobenzene and the like. In order to accelerate the reaction it is in some cases advisable to use an acid-binding agent, such as anhydrous sodium acetate or pyridine. The resulting colorants are, for example, crystalline or, for example, amorphous and in most cases are obtained in very good yield and in a pure state. It is advantageous first to precipitate the acid chlorides obtained from the carboxylic acids. In some cases, however, precipitation of the acid chlorides can be dispensed with without adverse consequences and the condensation reaction can take place immediately after the preparation of the carboxylic acid chlorides.

The pigments according to the invention can, for example, be used in the form of the crude products. If desired, however, the crude products can be converted to a finely divided form by grinding or kneading. In this case, grinding assistants, such as inorganic and/or organic salts, in the presence or absence of organic solvents, are advantageously used. After grinding, the assistants are removed in the customary manner, soluble inorganic salts being removed, for example, with water and organic assistants which are insoluble in water being removed, for example, by steam distillation. An improvement in the properties can also frequently be achieved, if desired, by treating the crude pigments with organic solvents, preferably those which boil above 100° C. Solvents which prove particularly suitable are benzenes substituted by halogen atoms or alkyl or nitro groups, such as xylenes, chlorobenzene, o-dichlorobenzene or nitrobenzene, as well as pyridine bases, such as pyridine, picoline or quinoline, and also ketones, such as cyclohexanone, ethers, such as ethylene glycol monomethyl ether or ethylene glycol monoethyl ether, amides, such as dimethylformamide or N-methyl-pyrrolidone, and dimethylsulfoxide, sulfolane or water on its own, if appropriate under pressure. The after-treatment can also be carried out in water in the presence of organic solvents and/or with the addition of surface-active substances.

The after-treatment is preferably carried out by heating the pigment in water or a solvent to 100° to 200° C., and in certain cases a coarsening of the grain and in some cases a change in the crystal modification take place, which has a favourable effect on the fastness to light and to migration of the resulting pigments.

The pigments obtained according to the invention are suitable for dyeing high molecular weight organic materials of natural or synthetic origin. Such materials can be, for example, naturally occurring resins, drying oils or rubber. However, the materials can also be modified naturally occurring substances, for example chlorinated rubber, oil-modified alkyd resins or viscose or cellulose derivatives, such as acetylcellulose and nitrocellulose, and especially wholly synthetic organic polyplasts, i.e. plastics which are prepared by polymerisation, polycondensation and polyaddition. This category of plastics includes, in particular: polyethylene, polypropylene, polyisobutylene, polystyrene, polyvinyl chloride, polyvinyl acetate, polyacrylonitrile, polyacrylates and polymethacrylates; polyesters, especially high-molecular esters of aromatic polycarboxylic acids with polyfunctional alcohols; polyamides; the condensation products of formaldehyde with phenols, i.e. the so-called phenoplasts, and the condensation products of formaldehyde with urea, thiourea and melamine, i.e. the so-called aminoplasts; the polyesters used as lacquer resins, and specifically those saturated resins, for example alkyd resins, and unsaturated resins, for example maleate resins, and also the polyaddition and polycondensation products of epichlorohydrin with polyols and polyphenols which are known under the name "epoxide resins"; and also the so-called thermoplastics, i.e. the non-curable polyplasts. It should be emphasised that not only the single compounds but also mixtures of polyplasts and also co-condensation products and copolymers, for example those based on butadiene, can be pigmented according to the invention.

The pigments according to the invention are particularly suitable for colouring polyplasts, such as so-called film-forming agents or binders known as lacquer raw materials, especially linseed oil varnish, nitrocellulose, alkyd resins, melamine resins and urea/formaldehyde resins. The pigmenting of the high molecular weight organic substances with the pigments of the formula (I) is carried out, for example, by mixing a pigment of this type, if desired in the form of a master batch, with these substrates, using roll mills, mixers or grinding equipment. The pigmented material is then brought into the desired final form by processes known per se, such as calendering, compression moulding, extrusion, spreading or casting or by injection moulding. Frequently it is desirable to incorporate so-called plasticisers into the high molecular weight compounds prior to shaping, in order to produce non-rigid mouldings or to reduce their brittleness. Examples of such plasticisers are esters of phosphoric acid, phthalic acid or sebacic acid. In the process according to the invention, the plasticisers can be incorporated in the polyplasts before or after the coloured pigment is incorporated. It is also possible, in order to obtain different colour shades, also to add fillers and other chromophoric constituents, such as white pigments, coloured pigments or black pigments, in any desired amounts, in addition to the compounds of the formula (I) to the high molecular weight organic materials.

For pigmenting lacquers and printing pastes, the high molecular weight organic materials and the compounds of the formula (I), if desired together with additives such as fillers, other pigments, siccatives or plasticisers, are finely dispersed or dissolved in the same organic solvent or solvent mixture. The procedure can be to disperse or dissolve the individual components on their own, or to disperse or dissolve several components together, and only then to mix all of the components.

The pigmented high molecular weight organic materials in general contain a compound of the formula (I) in amounts of 0.001 to 30% by weight, based on the high molecular weight organic material to be pigmented; polyplasts and lacquers preferably contain 0.1–5% by weight and printing pastes preferably contain 10–30% by weight. The amount of pigment to be chosen depends in particular on the desired tinctorial strength and also on the layer thickness of the moulding and finally, where appropriate, also on the content of white pigment in the polyplast.

The colorants according to the invention are distinguished by easy accessibility, good fastness to heat, light, over-lacquering, migration and weathering and especially by high clarity of the colour shade. Despite the high molecular weight of the diazo bases used and compared with diazo bases of lower molecular weight, the pigments according to the invention have a high tinctorial strength.

In the following examples parts are by weight, unless stated otherwise, percentages are by weight and temperatures are in degrees centigrade.

EXAMPLE 1

4.9 parts of 3-amino-4,2'-dichloro-5'-trifluoromethyl-benzanilide are dissolved in 65 parts by volume of glacial acetic acid at 56°. The pale yellow solution is stirred with 7.5 parts by volume of 37% hydrochloric acid, the resulting white suspension (hydrochloride) is diluted with 15 parts of water and cooled to 5°, 3.8 parts by volume of 4 N sodium nitrite solution are added dropwise in the course of 8 minutes and at 5° and the resulting diazo solution is filtered to give a clear filtrate. 6 parts of 3,5-dicarboethoxy-4-methyl-2-(2'-hydroxy-3'-naphthoylamino)-thiophen are then dissolved with 5 parts by volume of 30% sodium hydroxide solution in 110 parts of water and 250 parts by volume of alcohol at 42°. The orange solution is filtered and cooled to 8° and, at this temperature, the diazo solution is added dropwise in the course of 10 minutes. A red precipitate forms. The pH value of the resulting suspension is adjusted to 5 by adding 40 parts by volume of 30% aqueous sodium hydroxide solution and the mixture is stirred for 4 hours at a temperature which rises up to 20°, then heated to 75° in the course of one hour and finally filtered hot with suction. The residue is washed until salt-free and dried in vacuo at 60°. 10 parts, corresponding to 91% of theory, of a red powder of the formula for 1 hour. A vigorous evolution of gas is observed and a yellow solution forms.

25.7 parts of 2-amino-3,5-dicarboethoxy-4-methyl-thiophen are then dissolved in 175 parts by volume of dried chlorobenzene at 60° and the solution is allowed to drip into the acid chloride solution in the course of 1 minute. The resulting solution is heated to 128° in the course of 30 minutes, stirred at this temperature for 15 hours and then allowed to cool. The yellow precipitate which has separated out is filtered off with suction and washed successively with methanol and hot water. After drying in vacuo at 60°, 31.5 parts (73.7% of theory) of a pale yellow powder of the formula

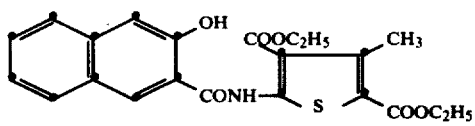

are obtained. The melting point of the product is 190°–192°.

Analysis: Calculated: C, 61.81; H, 4.95; N, 3.28; S, 7.50%. Found: C, 62.0; H, 4.95; N, 3.3; S, 7.6%.

The following tables list further pigments which are obtained when the diazo compounds of the amines listed in column II are coupled in accordance with the instructions of Example 1 with 3,5-dicarboethoxy-4-methyl-2-(2'-hydroxy-3'-naphthoylamino)-thiophen. Column III indicates the solvent used for recrystallisation and column IV gives the shade of polyvinyl chloride coloured with the pigment.

| Example | Diazo component | Solvent | Shade in PVC |
|---|---|---|---|
| 2 | 3-Amino-4,2',4',5'-tetrachlorobenzanilide | N-Methyl-pyrrolidone | scarlet |
| 3 | 3-Amino-4,2'-dichloro-5'-carbamyl-benzanilide | Dimethylformamide | scarlet |

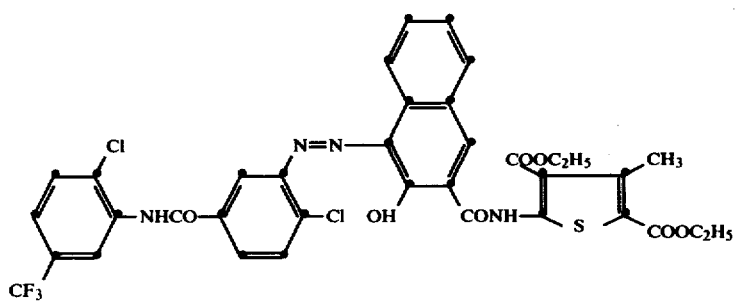

are obtained. The pigment after-treated in dimethylformamide (1 hour at 151°) produces fast, deep and brilliant scarlet dyeings in polyvinyl chloride.

Analysis: Calculated: C, 54.90; H, 3.46; Cl, 9.00; F, 7.24; N, 7.11; S, 4.07%. Found: C, 54.7; H, 3.5; Cl, 8.6; F, 7.2; N, 7.2; S, 4.2%.

3,5-Dicarboethoxy-4-methyl-2-(2'-hydroxy-3'-naphthoylamino)-thiophen can be prepared as follows: 12.6 parts of thionyl chloride and 3 drops of dimethylformamide are added to a suspension of 19 parts of 2-hydroxy-3-naphthoic acid in 100 parts by volume of dried chlorobenzene and the mixture is heated to 74° in the course of 15 minutes and stirred at this temperature

| 4 | 1-Amino-2-chlorobenzene-5-carboxylic acid 4'-benzoylaminophenylamide | Dimethyl formamide | orange-red |
| 5 | 3-Amino-4,2',5'-trichlorobenzanilide | Dimethylformamide | scarlet |
| 6 | 3-Amino-4,2',3',4'-tetrachlorobenzanilide | N-Methyl-pyrrolidone | red |
| 7 | 7-Amino-6-chloro-4-methyl-2-quinolone | N-Methyl-pyrrolidone | scarlet |
| 8 | 6-Amino-7-chloro-4-methyl-2-quinolone | N-Methyl-pyrrolidone | claret |
| 9 | 3-Amino-4,2'-dichloro-5-carbomethoxy-benzanilide | Dimethylformamide | red-orange |
| 10 | 2-(4'-Aminophenyl)-4- | N-Methyl-pyrroli- | violet |

-continued

| Example | Diazo component | Solvent | Shade in PVC |
|---|---|---|---|
| 11 | quinazolone 2-(3'-Amino-4'-chloro-phenyl)-4-quinazolone | Dimethylformamide | red |
| 12 | 3-Amino-4-chloro-2',4'-dimethyl-benzanilide | Dimethylformamide | red |
| 13 | 4-(3'-Amino-4'-chloro-benzoylamino)-benzoyl-cyclohexylamide | Dimethylformamide | red-orange |
| 14 | 3-Amino-4-chlorobenzene-5-carboxylic acid (2',5'-dimethoxy-4'-benzoylamino)-phenyl-amide | Dimethylformamide | red |
| 15 | 4-(3'-Amino-4'-chloro-benzoylamino)-2''-chloro-5''-trifluoro-methyl-benzanilide | Dimethylformamide | scarlet |
| 16 | 3-(3'-Amino-4'-chlorobenzoylamino)-4,3'',5''-trichloro-benzanilide | Dimethylformamide | orange |
| 17 | 3-(3'-Amino-4'-chloro-benzoylamino)-4,4'''-dichloro-2''',5'''-dimethoxybenzanilide | Dimethylformamide | orange |
| 18 | 1-Amino-2-methyl-5-carboxylic acid 4'-benzoylamino-phenylanilide | Dimethylformamide | ruby red |

Further pigments obtained from 3-cyano-4-methyl-5-carbomethoxy-2-(2'-hydroxy-3'-naphthoylamino)-thiophen:

| Example | Diazo component | Solvent | Shade in PVC |
|---|---|---|---|
| 19 | 3-Amino-4,2',5'-trichlorobenzanilide | N-Methyl-pyrrolidone | red |
| 20 | 7-Amino-6-chloro-4-methyl-2-quinolone | N-Methyl-pyrrolidone | violet |
| 21 | 3-Amino-4,2',4',5'-tetrachlorobenzanilide | N-Methyl-pyrrolidone | red-violet |
| 22 | 3-Amino-4,2'-dichloro-5'-trifluoromethyl-benzanilide | N-Methyl-pyrrolidone | ruby red |
| 23 | 3-Amino-4,4'-dichloro-2',5'-dimethoxy-benzanilide | Dimethylformamide | brown |
| 24 | 1-Amino-2-chlorobenzene-5-carboxylic acid 4'-benzoylamino-phenylamide | N-methyl-pyrrolidone | red |
| 25 | 3-(3-Amino-4'-chlorobenzoylamino)-4-chlorobenzanilide | Dimethylformamide | red |
| 26 | 3-Amino-4,2'-dichlorobenzanilide | Dimethylformamide | red |
| 27 | 3-Amino-4-chloro-2',4'-dimethyl-benzanilide | Dimethylformamide | red |
| 28 | 3-Amino-4,2',3',4'-tetrachlorobenzanilide | N-Methyl-pyrrolidone | brown |
| 29 | 4-(3'-Amino-4'-chlorobenzoylamino)-benzoylcyclohexylamide | Dimethylformamide | ruby red |
| 30 | Phenyl 3-(3'-amino-4'-chlorobenzoylamino)-4-methyl-4''-carbo-N-methyl-pyrroli- | N-methyl-pyrrolidone | red |
| 31 | 3-(3'-Amino-4'-chloro-benzoylamino)-4,3'',5''-trichloro-benzanilide | N-Methyl-pyrrolidone | ruby red |

-continued

| Example | Diazo component | Solvent | Shade in PVC |
|---|---|---|---|
| 32 | 4-(3'-Amino-4'-chloro-benzoylamino)-2''-chloro-5''-trifluoro-methyl-benzanilide | Dimethylformamide | scarlet |
| 33 | 4-(3'-Amino-4'-chloro-benzoylamino)-benzanilide | Dimethylformamide | red |
| 34 | 3-Amino-4-chloro-2',5'-dimethoxy-4'-benzoyl-amino-benzanilide | N-Methyl-pyrrolidone | carmine |
| 35 | 3-Amino-4-methoxy-benzanilide | Dimethylformamide | violet |
| 36 | 3-Amino-4-methoxy-4'-benzoylamino-benzanilide | N-Methyl-pyrrolidone | violet |
| 37 | 3-Amino-4-methyl-4'-benzoylamino-benzanilide | N-Methyl-pyrrolidone | carmine |
| 38 | 5-Amino-6-chloro-benzimidazolone | N-Methyl-pyrrolidone | blue |

Pigments obtained from 2,5-dicarbomethoxy-3-(2'-hydroxy-3'-naphthoylamino)-thiophen:

| Example | Diazo component | Solvent | Shade in PVC |
|---|---|---|---|
| 39 | 3-Amino-4,2'-dichloro-5'-trifluoromethyl-benzanilide | Dimethylformamide | scarlet |
| 40 | 3-Amino-4,2',4',5'-tetrachlorobenzanilide | Dimethylformamide | red |
| 41 | 3-Amino-4-chloro-4'-benzoylamino-benzanilide | Dimethylformamide | orange |
| 42 | 3-Amino-4-chloro-2',5'-dimethoxy-4'-benzoyl-amino-benzanilide | Dimethylformamide | scarlet |

Pigments obtained from 3-carboethoxy-4-methyl-5-carbomethoxy-2-(2'-hydroxy-3'-naphthoylamino)-thiophen:

| Example | Diazo component | Solvent | Shade in PVC |
|---|---|---|---|
| 43 | 3-Amino-4,2'-dichloro-5'-trifluoromethyl-benzanilide | Dimethylformamide | scarlet |
| 44 | 3-Amino-4,2',4',5'-tetrachloro-benzanilide | N-Methyl-pyrrolidone | red |
| 45 | 3-Amino-4-chloro-4'-benzoylamino-benzanilide | Dimethylformamide | scarlet |
| 46 | 3-Amino-4,2',5'-trichlorobenzanilide | Dimethylformamide | red |

Pigments obtained from 3,5-dicarbomethoxy-4-methyl-2-(2'-hydroxy-3'-naphthoylamino)-thiophen:

| Example | Diazo component | Solvent | Shade in PVC |
|---|---|---|---|
| 47 | 3-Amino-4,2'-dichloro-5'-trifluoromethyl-benzanilide | Dimethylformamide | scarlet |
| 48 | 3-Amino-4,2',4',5'-tetrachlorobenzanilide | N-Methyl-pyrrolidone | red |
| 49 | 3-Amino-4-chloro-4'-benzoylamino-benzanilide | N-Methyl-pyrrolidone | ruby red |

Pigments obtained from 2-(2'-hydroxy-3'-naphthoylamino)-3-carboethoxy-4-methylthiophen-5-carboxylic acid anilide:

| Example | Diazo component | Solvent | Shade in PVC |
|---|---|---|---|
| 50 | 3-Amino-4,2',5'-trichlorobenzanilide | Dimethylformamide | red |
| 51 | 3-Amino-4-methoxy-benzanilide | Dimethylformamide | carmine |

Pigments obtained from 2-(2'-hydroxy-3'-naphthoylamino)-3-carboethoxy-4-methylthiophen-5-carboxylic acid anilide:

| Example | Diazo component | Solvent | Shade in PVC |
|---|---|---|---|
| 52 | 3-Amino-4,2'-dichloro-5'-trifluoromethyl-benzanilide | Dimethylformamide | orange |
| 53 | 3-Amino-4,2'4',5'-tetrachloro-benzanilide | Dimethylformamide | scarlet |
| 54 | 3-Amino-4,2',5'-trichloro-benzanilide | Dimethylformamide | red |
| 55 | 3-Amino-4,2',3',4'-tetrachlorobenzanilide | Dimethylformamide | brown-orange |

Pigments obtained from 2-(2'-hydroxy-3'-naphthoylamino)-3-cyano-4-methylthiophen-5-carboxylic acid anilide:

| Example | Diazo component | Solvent | Shade in PVC |
|---|---|---|---|
| 56 | 3-Amino-4,2'-dichloro-5'-trifluoromethyl-benzanilide | Dimethylformamide | red-orange |
| 57 | 3-Amino-4,2',4',5'-tetrachlorobenzanilide | Dimethylformamide | red |
| 58 | 3-Amino-4,2',5'-trichlorobenzanilide | Dimethylformamide | red-orange |
| 59 | 3-Amino-4-chloro-4'-benzoylamino-benzanilide | Dimethylformamide | red |

EXAMPLE 60

5.2 parts of 3-amino-4,2'-dichloro-5'-trifluoromethyl-benzanilide and 6.4 parts of 3,5-dicarboethoxy-4-methyl-2-(2'-hydroxy-3'-naphthoylamino)-thiophen are dissolved in 150 parts by volume of dimethylformamide at 62°. The clear greenish solution is mixed with 1.3 parts by volume of 37% hydrochloric acid and 4.1 parts by volume of 4 N sodium nitrite solution and then added dropwise in the course of 10 minutes. A thick red precipitate separates out and the temperature rises to 76°. The red suspension is stirred at 76° for 30 minutes, heated to 136°, stirred at this temperature for a further 30 minutes, cooled to 90° and filtered hot with suction. The residue is finally washed successively with dimethylformamide, hot water and hot methanol and dried in vacuo at 60°. This yields 9.4 parts (79% of theory) of a product which has the same formula and the same coloristic properties as the pigment described in Example 1.

EXAMPLE 61

5.7 parts of the azocarboxylic acid chloride prepared according to Example 1 of German Offenlegungsschrift No. 2,261,883 and 2.6 parts of 2-amino-3,5-dicarboethoxy-4-methylthiophen in 160 parts by volume of anhydrous o-dichlorobenzene are heated to 90°. The resulting red suspension is stirred at 90° for 16 hours and filtered hot with suction. The material on the suction filter is washed successively with o-dichlorobenzene, dimethylformamide and hot methanol and dried in vacuo at 60°. 7.1 parts (90% of theory) of the pigment of the formula

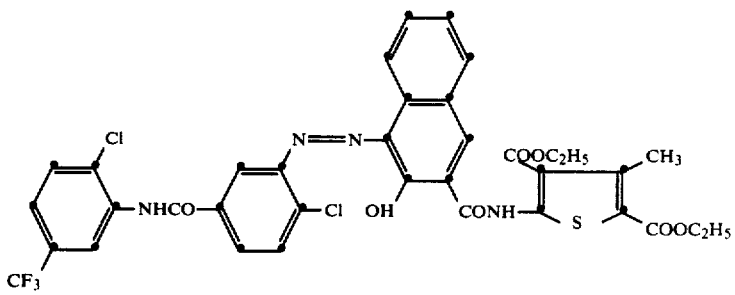

are obtained.

The IR spectra and the coloristic properties for Examples 1, 60 and 61 are identical.

EXAMPLE 62

0.6 g of the pigment prepared according to Example 1 is mixed together with 67 g of polyvinyl chloride, 33 g of dioctyl phthalate, 2 g of dibutyl-tin dilaurate and 2 g of titanium dioxide and the mixture is processed for 15 minutes at 160° on a roll mill to give a thin film. The scarlet colouration produced in this way is deep and fast to migration and light.

EXAMPLE 63

1.00 g of the pigment prepared according to Example 1 is finely ground on an Engelsmann grinding machine with 4.00 g of a printing varnish made up of 29.4% linseed oil-stand oil (300 Poise), 67.2% of linseed oil-stand oil (20 Poise), 2.1% of cobalt octoate (8% of Co) and 1.3% of lead octoate (24% of Pb) and then printed with the aid of a block by the letterpress process in an amount of 1 g/m² on art paper. A deep, clear scarlet shade with good transparency and good gloss is obtained.

The pigment is also suitable for other printing processes, such as gravure printing, offset printing and flexographic printing, and in these cases also gives very good results.

EXAMPLE 64

15 g of a collodion cotton containing 35% of butanol, 15 g of a phthalate resin modified with castor oil, 15 g of a 70% solution of a urea varnish resin in butanol, 20 g of butyl acetate, 10 g of glycol monoethyl ether, 20 g of toluene and 5 g of alcohol are processed to a lacquer. This is then pigmented with 2 g of the colorant according to Example 1 and 2 g of titanium dioxide (rutile) and ground. After spraying on cardboard and drying the lacquer, a scarlet coating with very good fastness to light and over-lacquering is obtained.

EXAMPLE 65

1 g of the colorant according to Example 1 and 5 g of titanium dioxide are added to 100 g of a baking lacquer which consists of 58.5 g of a 60% solution of a coconut alkyd resin (Beckosol 27/320) in xylene, 23 g of a 65% solution of a melamine varnish resin (Super Beckamin 13/501) in butanol, 17 g of xylene and 1.5 g of butanol. The mixture is ground in a ball mill for 48 hours and the lacquer pigmented in this way is sprayed onto a cleaned metal surface. After baking at 120°, a scarlet colouration with good fastness to light and over-lacquering is obtained.

What is claimed is:

1. A monoazo pigment of the formula

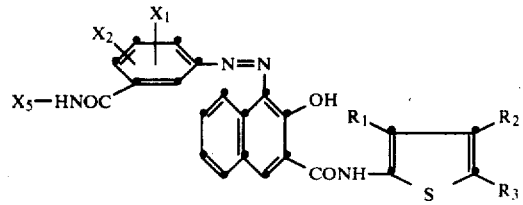

in which $R_2$ is methyl, $R_1$ is cyano or $—COOR_6$ and $R_3$ is $—COOR_6$ wherein $R_6$ is methyl or ethyl, $X_1$ and $X_2$ are independently hydrogen, halogen, alkyl having 1–4 C atoms or alkoxy having 1–4 C atoms, and $X_5$ is phenyl or phenyl substituted by one, two or three identical or different substituents selected from the group consisting of chlorine, alkyl having 1–4 C atoms, alkoxy having 1–4 C atoms, trifluoromethyl, $—COOX_4$, $—CONHX_4$, $—NHCOX_4$ and $—CONH_2$ in which $X_4$ is alkyl having 1–4 C atoms, phenyl, benzyl, or said phenyl or said benzyl substituted by halogen or by alkyl having 1–4 C atoms.

2. The monoazo pigment according to claim 1 of the formula

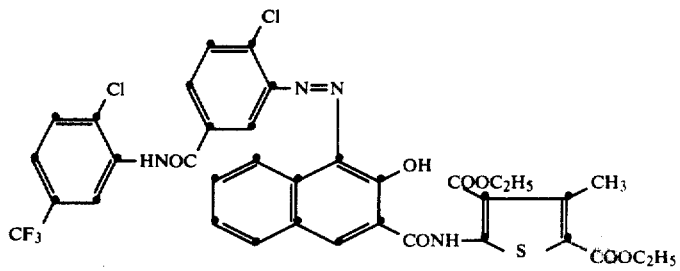

3. The monoazo pigment according to claim 1 of the formula

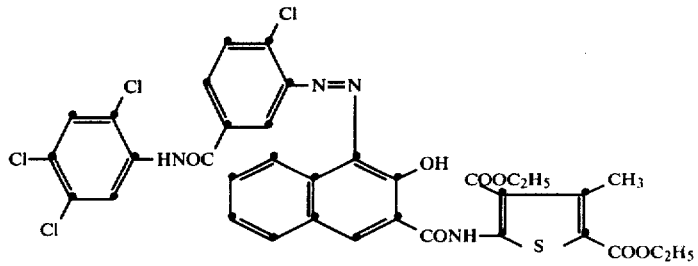

4. The monoazo pigment according to claim 1 of the formula

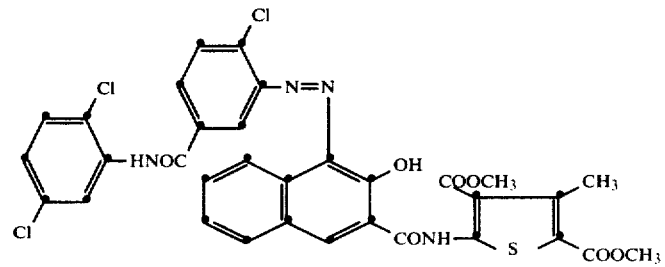

5. The monoazo pigment according to claim 1 of the formula

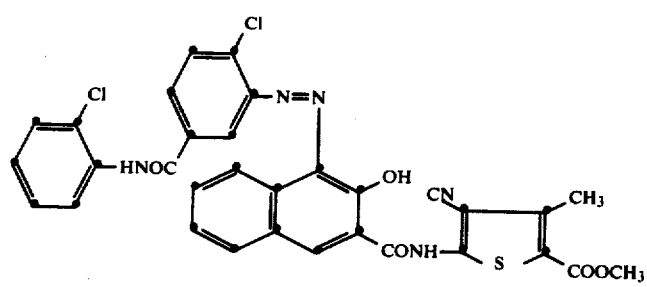
6. The monoazo pigment according to claim 1 of the formula
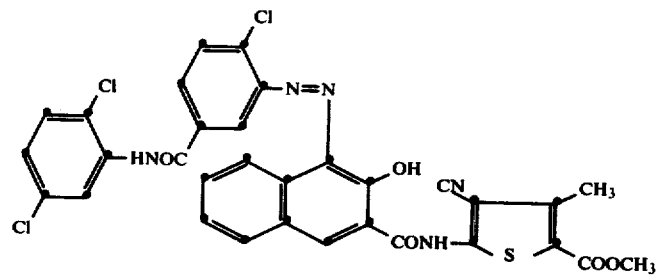
* * * * *